(No Model.)

C. R. H. M. HABENICHT.
APPARATUS FOR COOLING TIN PLATES IN CRYSTALLIZATION.

No. 323,806. Patented Aug. 4, 1885.

UNITED STATES PATENT OFFICE.

CHARLES R. H. M. HABENICHT, OF NEW YORK, N. Y., ASSIGNOR TO THE TIN-PLATE DECORATING COMPANY, OF SAME PLACE.

APPARATUS FOR COOLING TIN PLATES IN CRYSTALLIZATION.

SPECIFICATION forming part of Letters Patent No. 323,806, dated August 4, 1885.

Application filed July 31, 1884. (No model.)

*To all whom it may concern:*

Be it known that I, CHARLES R. H. M. HABENICHT, a citizen of the United States, residing at New York, in the county of New York and State of New York, have invented certain new and useful Improvements in Apparatus for Cooling Tin Plates in Crystallization, of which the following is a specification, reference being had therein to the accompanying drawings.

In the manufacture of crystallized tin plates by the well-known process of alternately heating and cooling the plates, I have heretofore adopted a cooling apparatus consisting of a water-distributing chamber having a series of upwardly-projecting spouts to support the plates, as described in Letters Patent of the United States, No. 300,599, granted to me June 17, 1884. This apparatus well answers the desired purpose, but is expensive in construction, due to the number of spouts required, and to overcome this disadvantage is the object of my present invention, which object I have accomplished by the novel means hereinafter described, and illustrated in the accompanying drawings, in which—

Figure 1:
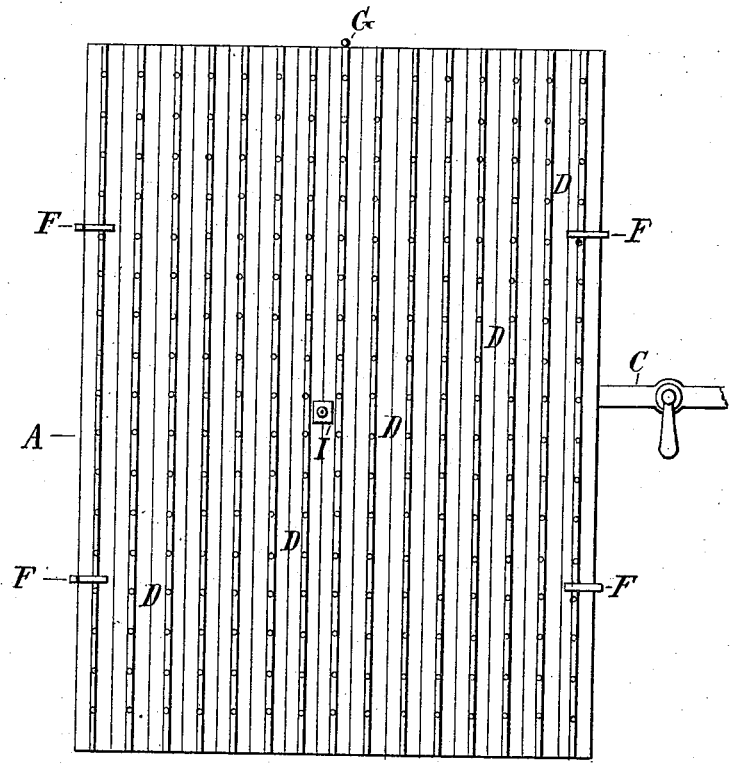
Figure 2:
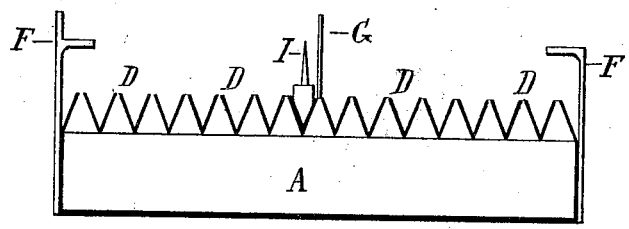

Figure 1 is a plan or top view of an apparatus containing my present invention. Fig. 2 is a cross-section thereof.

Similar letters indicate similar parts.

The letter A designates a chamber, which is adapted to be supplied with water through a pipe, C, having a suitable cock, and from which the water is distributed to a series of ridges or roof-like elevations, D, formed upon the chamber. These ridges D are parallel to each other, they being side by side, and each is perforated at the top approximately the entire length, so that the water may escape therefrom in jets.

The letter F indicates brackets affixed to opposite sides of the chamber A for supporting the tin plates to be cooled, these brackets being of such height as to bring the plates a short distance above the ridges D, but not in contact therewith.

In applying the apparatus to use the heated tin plates are laid on the brackets F and water is supplied to the chamber A under pressure, and since the water now escaping through the perforated ridges D comes in contact with the plate upon the brackets the desired effect is produced, the relative position of the holes of the ridges determining the disposition of the marks of crystallization. It will be noticed that the surface of the tin plates presented to the jets of water is entirely free from contact with any object, and consequently the crystallization is not liable to be affected by that means, while the gutters formed between the ridges afford a ready means of escape to the spent water.

In order to facilitate the adjustment of the tin plates on the brackets F, those brackets which are on one side of the chamber A are step shaped to act as stops, and a stop or gage, G, is also affixed to one end of the chamber. When the apparatus is of large size, a central prop or support, I, is used to keep the tin plate from sagging.

What I claim as new, and desire to secure by Letters Patent, is—

1. An apparatus for cooling tin plates in the process of crystallization, consisting of a water-distributing chamber provided at its top with a series of parallel ridges, having perforations along its top edge, and inclined side walls, forming continuous passage-ways between the ridges for the escape of water issuing from the tops of the ridges, substantially as described.

2. An apparatus for cooling tin plates in the process of crystallization, consisting of a water-distributing chamber provided at its top with parallel ridges perforated along their top edge, and having continuous sides forming passage-ways intermediate of the ridges, and side brackets for supporting a plate above said ridges, substantially as described.

3. An apparatus for cooling tin plates in the process of crystallization, consisting of a water-distributing chamber provided at its top with perforated ridges, and side brackets for supporting a plate above the ridges, the brackets on at least one side of the chamber being step-shaped, substantially as described.

4. The combination, with chamber A, having perforated ridges D, of side brackets, F, gage G, and support I, substantially as described.

In testimony whereof I affix my signature in presence of two witnesses.

CHAS. R. H. M. HABENICHT.

Witnesses:
FRANCIS CLARE BOWEN.
JAS. S. EWBANK.